(12) United States Patent
Ramirez et al.

(10) Patent No.: US 7,458,756 B2
(45) Date of Patent: Dec. 2, 2008

(54) METHOD FOR LOADING TUBE BUNDLES ON RAILCARS AND TUBE PACKS FOR RAILCARS

(75) Inventors: Efren Ramirez, Whittier, CA (US); Stanley Curtis Whittemore, La Habra, CA (US)

(73) Assignee: Western Tube & Conduit Corporation, Long Beach, CA (US)

( * ) Notice: Subject to any disclaimer, the term of this patent is extended or adjusted under 35 U.S.C. 154(b) by 0 days.

(21) Appl. No.: 12/106,819

(22) Filed: Apr. 21, 2008

(65) Prior Publication Data
US 2008/0193244 A1 Aug. 14, 2008

Related U.S. Application Data

(62) Division of application No. 11/231,682, filed on Sep. 20, 2005, now Pat. No. 7,381,020.

(51) Int. Cl.
*B60P 7/08* (2006.01)
(52) U.S. Cl. .............................. 410/98; 410/36; 410/40; 410/42; 410/87; 410/122

(58) Field of Classification Search ............... 410/32, 410/34, 36, 37, 39, 40, 42, 47, 87, 97, 98, 410/122, 155; 105/355; 206/443, 446; 211/59.4, 211/70.4; 248/68.1
See application file for complete search history.

(56) References Cited

U.S. PATENT DOCUMENTS 5,516,244 A * 5/1996 Baka ........................ 410/36
7,381,021 B1 * 6/2008 Terao et al. ................ 410/98

* cited by examiner

*Primary Examiner*—Stephen Gordon
(74) *Attorney, Agent, or Firm*—Foley & Lardner LLP

(57) ABSTRACT

A method for loading tube bundles on a railcar includes placing the tube bundles lengthwise on the car and stacked above the bed of the car to form tube bundle packs. The packs are separated by panels. A spacing block is configured to go within the longitudinally extending remaining space left over after loading a finite number of packs. This spacing block include parallel plates which are rigidly displaced one from another by blocks. Padding is arranged on the outer side of the plates and the panels. Padding is arranged on the bulkheads as well. The panels and spacing block may be tied to the railcar through boards and dunnage.

4 Claims, 1 Drawing Sheet

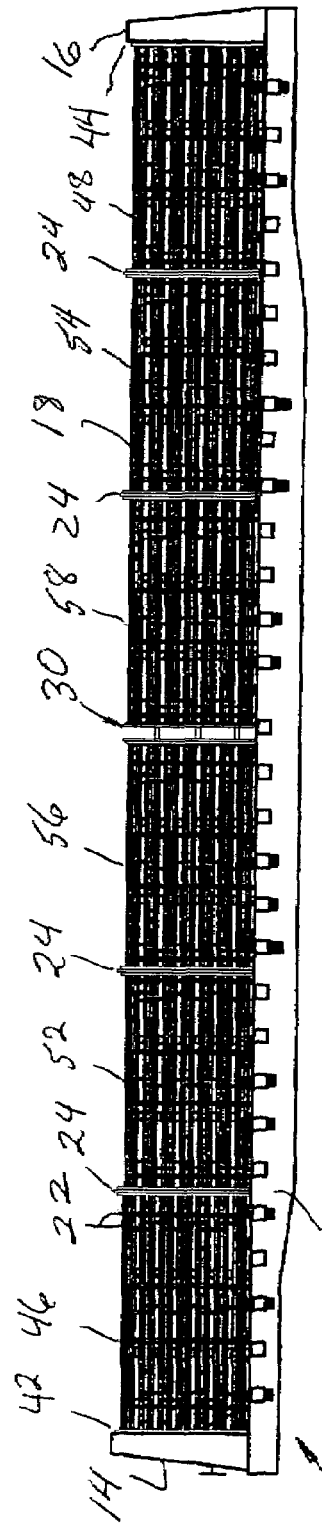
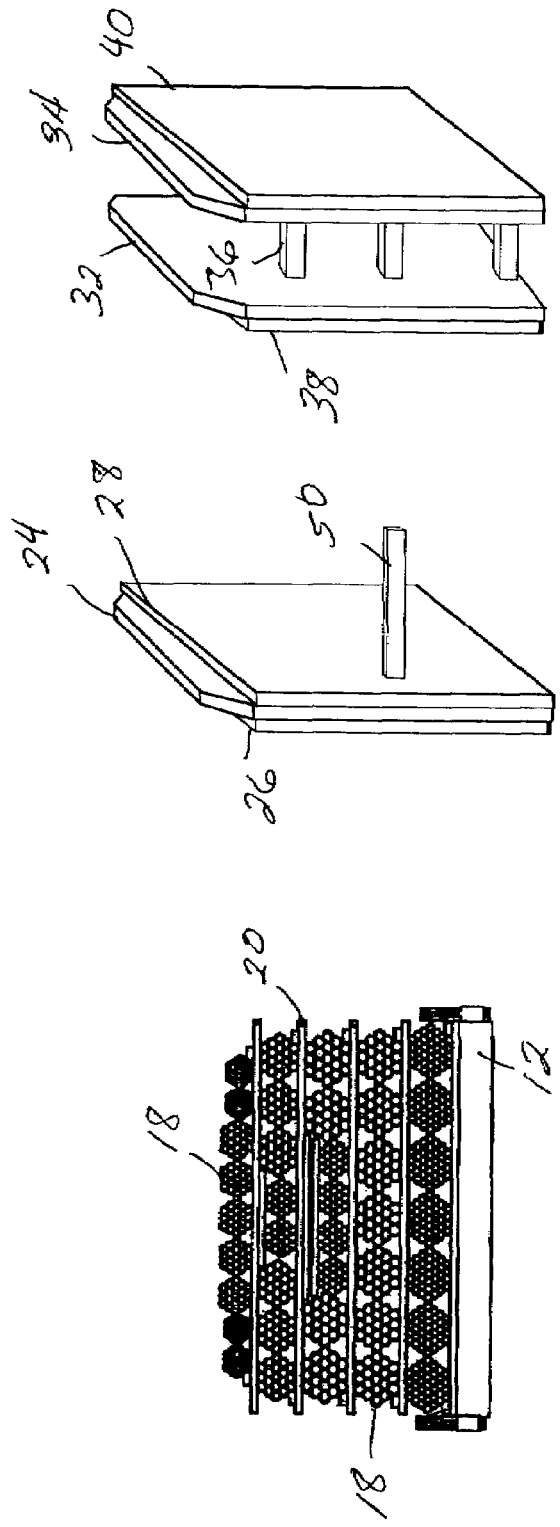

METHOD FOR LOADING TUBE BUNDLES ON RAILCARS AND TUBE PACKS FOR RAILCARS

CROSS-REFERENCE TO RELATED APPLICATIONS

This application is a divisional application of U.S. patent application Ser. No. 11/231,682, filed Sep. 20, 2005, now U.S. Pat. No. 7,381,020 "METHOD FOR LOADING TUBE BUNDLES ON RAILCARS AND TUBE PACKS FOR RAILCARS", the contents of which are incorporated by reference herein.

FIELD OF THE INVENTION

The field of the present invention is systems for loading railcars and packs thereon.

BACKGROUND OF THE INVENTION

The rail industry has developed a great deal of experience in the handling of materials on railcars. Particular requirements have been established for stacking materials on flat cars including dunnage, blocking and specific strapping requirements.

With bundled, elongate products such as tubing, wood beams are laid laterally across the car as dunnage to support the bundles. The tubes are in bundles and extend longitudinally of the railcar. Short stakes, blocking and strapping then retain the load in place. FIG. 2 illustrates one such recommended stacking.

In spite of these carefully defined methods and devices for retaining tube bundles, the natural vibration of the car can result in individual tubes slowly working longitudinally outwardly from the bundle. If left unattended, the individual tubes can extend into harms way or come into contact with adjacent tube bundles or bulkheads. This can make the bundles difficult to unload and cause damage to the tubing. Substantial damage to the ends of tubes has been experienced in the industry from this phenomenon. Naturally, bulkheads can be placed against the ends of the tubing or the tubing against barriers. However, such assemblies create their own problems in terms of loading, unloading and damage from motion of the tubes relative to other tubes, the bulkheads and barriers.

SUMMARY OF THE INVENTION

The present invention is directed to a method for loading tube bundles on railcars and the tube pack created. The present invention is employed with tube bundles placed lengthwise on the bed of the railcar, stacked conventionally above the bed to form packs of multiple tube bundles.

In a first separate aspect of the present invention, a method for loading tube bundles on a railcar having a bed and bulkheads includes placing the tube bundles lengthwise on and stacked above the bed to form packs of multiple tube bundles, affixing resilient sheet material to either side of multiple panels and placing the panels with the resilient sheet material at the ends of the packs. The packs and panels are then closely abutted with little or no longitudinal space thereamong. A final longitudinal gap with all packs loaded on the railcar is then filled with a spacing block configured with fixed parallel plates rigidly displaced and including resilient sheet material to either side of the spacing block.

In a second separate aspect of the present invention, a method for loading tube bundles on a railcar having a bed and bulkheads includes placing the tube bundles lengthwise on and stacked above the bed to form six packs of multiple tube bundles. Resilient sheet material is affixed to the railcar bulkheads and to either side of each of four panels. First and second packs are closely abutted against the railcar bulkheads and panels are placed at the other ends of the packs. Additional packs and panels are then added to finally leave a longitudinal gap. A spacing block is then configured to include parallel plates rigidly displaced one from another with resilient sheet material on either side of the spacing block and placed in the longitudinal gap.

In a third separate aspect of the present invention, a tube pack for a railcar having a bed and bulkheads includes tube bundles arranged in packs lengthwise on the bed. A spacing block having parallel plates rigidly displaced one from another and resilient sheet material on the parallel plates is positioned along with the packs. Panels with resilient sheet material on either side are located between all adjacent packs except adjacent the spacing block.

In a fourth separate aspect of the present invention, any of the foregoing aspects are combined to further advantage.

Accordingly, it is an object of the present invention to provide an improved method for loading tube bundles on a railcar. It is a further object of the present invention to provide an improved tube pack for a railcar. Other and further objects and advantages will appear hereinafter.

BRIEF DESCRIPTION OF THE DRAWINGS

FIG. 1 is a side view of a railcar with a tube pack.

FIG. 2 is an end view of the stacked tube bundles of FIG. 1 illustrating conventional packing of tube bundles.

FIG. 3 is a perspective view of a panel.

FIG. 4 is a perspective view of a spacing block.

DETAILED DESCRIPTION OF THE PREFERRED EMBODIMENT

Turning in detail to the Figures, a railcar, generally designated 10, includes a bed 12 and bulkheads 14, 16. The bulkheads 14, 16 are shown to be at either end of the bed 12. The railcar also includes standard railroad trucks, coupling and equipment (not shown).

Tube bundles 18 are shown placed on the bed 12 in acceptable configurations in accordance with standard practice. One such example of approved tube bundle stacking is illustrated in FIG. 2 which shows the packing of various sizes of tube bundles 18 to form a pack. Dunnage 20 is conventionally placed between rows of tube bundles 18 in the pack. Typically the tube bundles 18 are placed on the bed 12 by forklifts. Strapping 22 is able to tie each of the packs of tube bundles 18 to the bed 12 of the railcar 10.

Panels 24 are prepared from ¾" or 1" plywood sheets. As plywood comes in standard sizes, the standard sheets are appropriately combined to provide a panel 24 which extends across the full end of a pack of two bundles 18. Each panel 24 includes resilient sheeting material 26, 28 on each side. The resilient sheeting material 26, 28 is also intended to cover the end of a pack of tube bundles 18. The material 26, 28 may be of a number of durable materials. In the initial embodiments, resilient sheet material 26, 28 has been mats of woven hemp rope which are stapled to the panels 24. Rubber backed carpeting and the like may substitute for the woven hemp rope mats 26, 28.

Also employed is a spacing block, generally designated 30, as illustrated in FIG. 4. The spacing block 30 includes parallel plates 32, 34 which are rigidly displaced one from another by wood blocks 36 between the plates 32, 34. Either side of the spacing block 30 includes resilient sheeting material 38, 40 stapled to the outside surfaces. Again, mats 38, 40 of woven hemp rope have been employed.

A tube pack on a railcar employing the elements described above is here described for a railcar 62 feet long between the bulkheads 14, 16 with the tubes being 10 feet in length. Resilient sheeting material 42, 44 is also stapled to the bulkheads 14, 16 which are conventionally of wood. First and second packs 46, 48 are first loaded onto the bed 12 of the railcar 10. These packs are assembled from tube bundles 18 on the railcar with dunnage 20 and strapping 22 with the packs closely abutting the bulkheads with little or no longitudinal space between the ends of the packs 46, 48 and the bulkheads 14, 16 with the resilient sheeting material 42, 44 in place. Panels 24 with resilient sheeting material 26, 28 are then placed at the ends of the first and second packs 46, 48 distant from the bulkheads 14, 16. To retain the panels 24 fixed on the railcar so that they will not walk off the car during transit, boards 50 are nailed to the panels 24 and to the dunnage 20.

Following the placements of the panels 24 adjacent to the first and second packs 46, 48, third and fourth packs 52, 54 are assembled on the railcar 10 by closely abutting the packs 52, 54 against the previously placed panels 24 with little or no longitudinal space thereamong. Additional panels 24 are then placed fixed to the railcar by nailing boards 50 to the panels and to the adjacent dunnage 20. Fifth and sixth packs 56, 58 are then positioned as the third and fourth packs.

With the railcar 10 between the bulkheads 14, 16 being 62 feet in this example, the ten foot long tube bundles 18 forming the six packs 46, 48, 52, 54, 56, 58 and the intermediate panels 24 and resilient sheeting material 42, 44 being thereamong, a longitudinal space remains. This remaining space is far too short to receive an additional pack of tube bundles 18. The longitudinal dimension of this space can also very significantly due to tolerances and placement of the load. This space is estimated or measured and a spacing block 30 is configured with parallel plates 32, 34 and resilient sheeting material 38, 40 to either side of the spacing block 30. The configuration is undertaken by spacing the plywood parallel plates 32, 34 using wood blocks 36. The wood blocks are cut to an appropriate length for the spacing block 30 to fit closely within the remaining longitudinal gap. The spacing block 30 can be anchored to the railcar through the dunnage 20 as with the panels 24. The longitudinal remaining space can be located between the center packs 56, 58, between any of the adjacent packs or between one of the packs 46, 48 and one of the bulkheads 16, 18.

Accordingly, an improved system for facilely loading tube bundles on a railcar has been disclosed along with an improved tube pack. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for loading tube bundles on a railcar having a bed and bulkheads, comprising affixing resilient sheet material to the bulkheads;

affixing resilient sheet material to either side of four panels;

placing tube bundles lengthwise on the bed and stacked above the bed to form six packs of multiple tube bundles between the bulkheads;

closely abutting a first and second one of the packs against the bulkheads with little or no longitudinal space between the respective first and second packs and bulkheads;

placing first and second panels at ends of the first and second packs;

closely abutting a third and a fourth one of the packs against the first and second panels;

placing third and fourth panels at ends of the third and fourth packs;

closely abutting a fifth and a sixth one of the packs against the third and fourth panels leaving a final longitudinal gap between the fifth and sixth packs with all six packs loaded on the railcar;

configuring a spacing block including fixing parallel plates rigidly displaced one from another and affixing resilient sheet material to either side of the spacing block to fill the final longitudinal gap;

positioning the spacing block on the bed in the final longitudinal gap.

2. The method of claim 1 further comprising fixing the panels on the railcar.

3. The method of claim 2, fixing the panels on the railcar including nailing the panels to dunnage among adjacent ones of the tube bundles.

4. The method of claim 1, configuring the spacing block including fabricating the parallel plates with wood blocks extending therebetween, the parallel plates being plywood.

* * * * *